Figure 14:
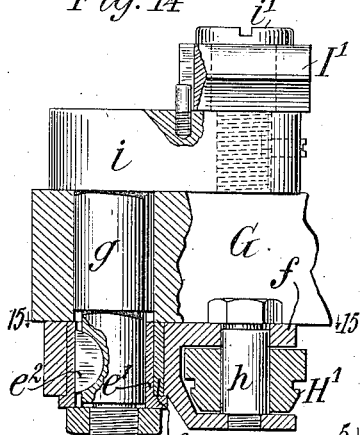

P. KRUSE.
MACHINE FOR SEAMING CAN TOPS.
APPLICATION FILED SEPT. 25, 1912.
1,164,103.
Patented Dec. 14, 1915.
6 SHEETS—SHEET 1.
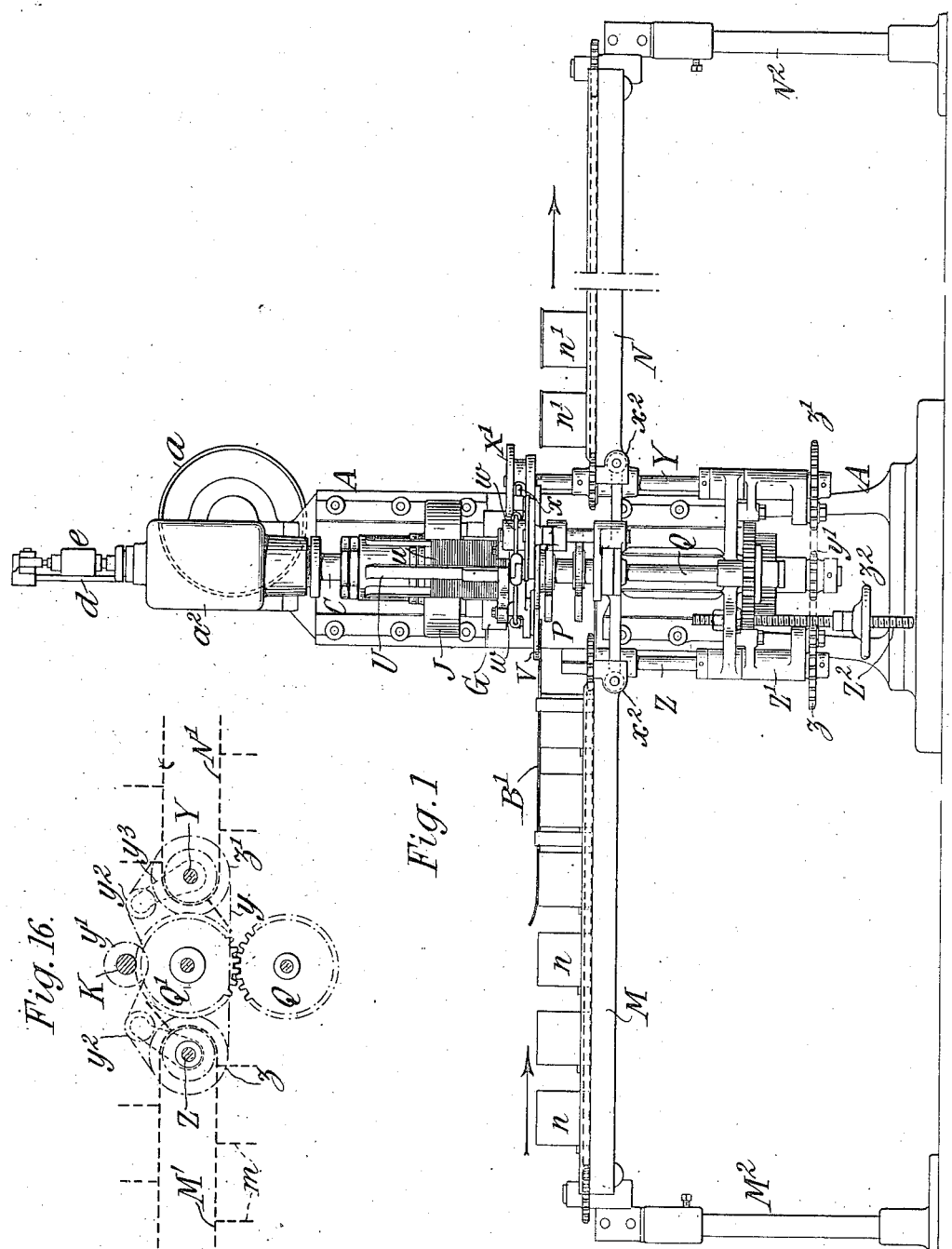
WITNESSES:
René Bruine
Fred White
INVENTOR:
Peter Kruse,
By Attorneys,

P. KRUSE.
MACHINE FOR SEAMING CAN TOPS.
APPLICATION FILED SEPT. 25, 1912.

1,164,103.

Patented Dec. 14, 1915.
6 SHEETS—SHEET 2.

INVENTOR
Peter Kruse,
By Attorneys,

WITNESSES

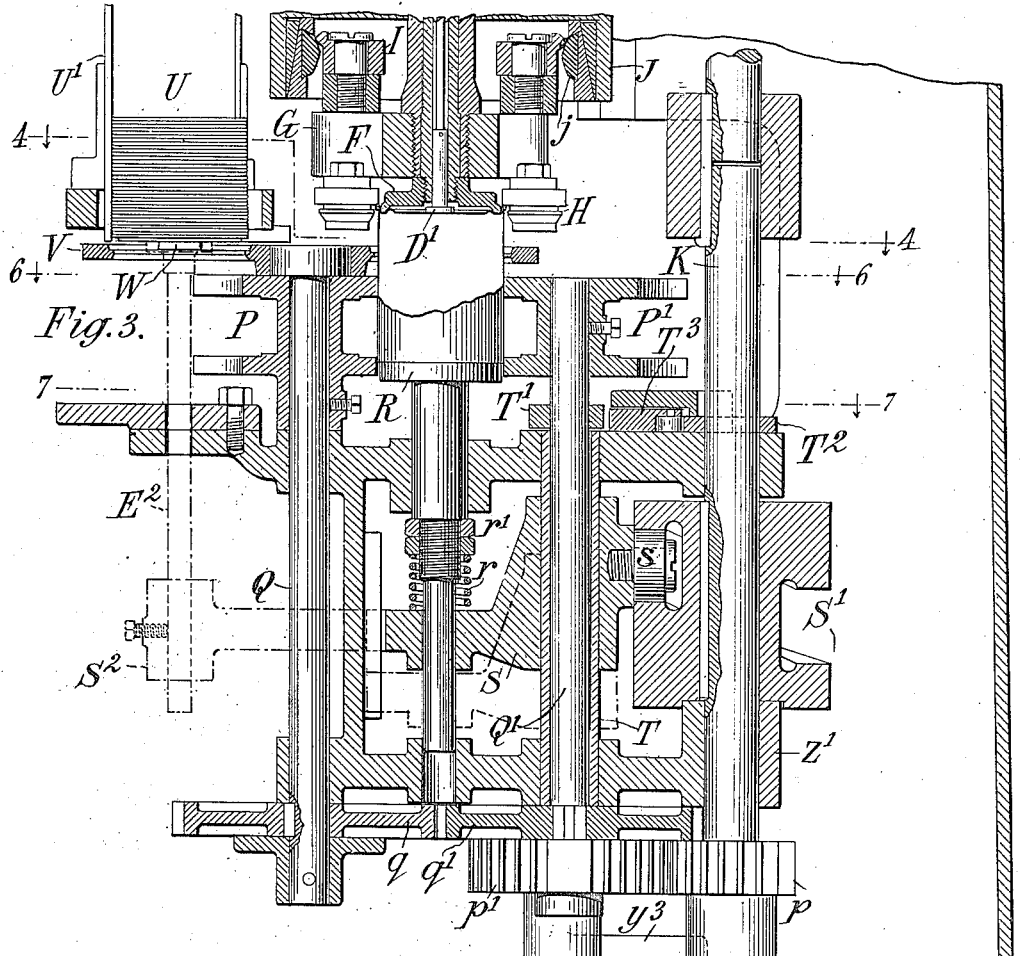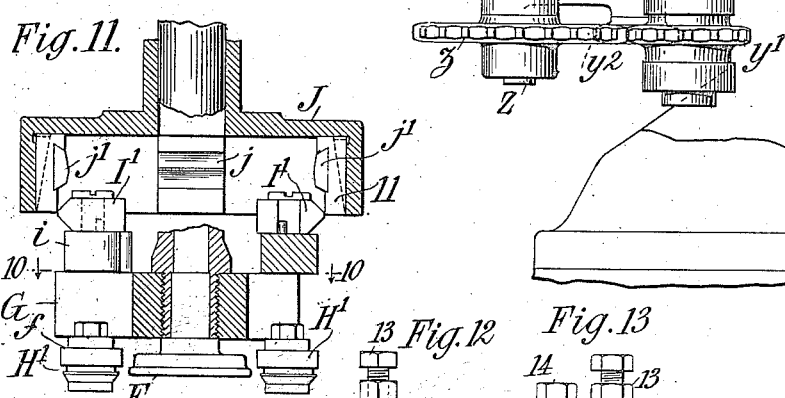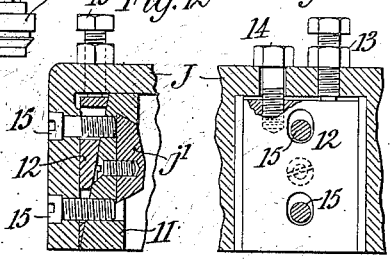

INVENTOR
Peter Kruse,
By Attorneys,
Fraser, Dunk & Meyers

WITNESSES:
René Bruine
Fred White

P. KRUSE.
MACHINE FOR SEAMING CAN TOPS.
APPLICATION FILED SEPT. 25, 1912.
1,164,103.
Patented Dec. 14, 1915.
6 SHEETS—SHEET 5.
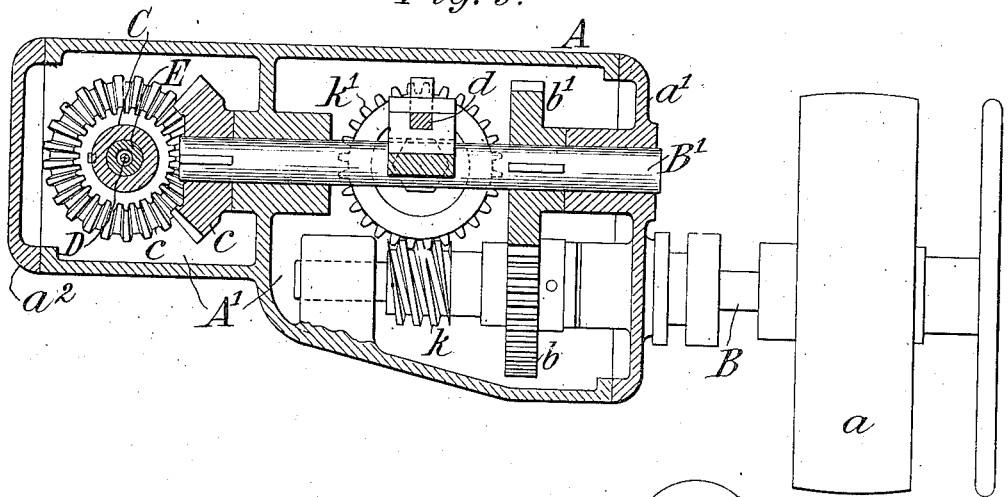
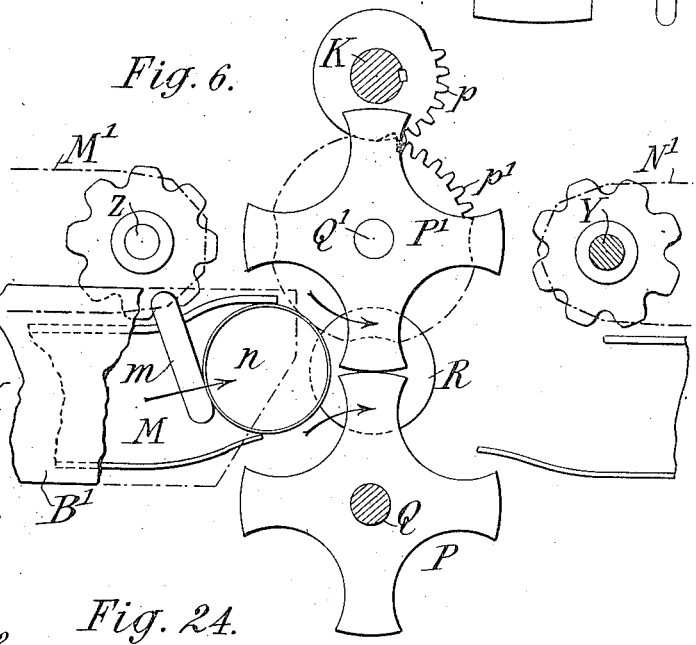
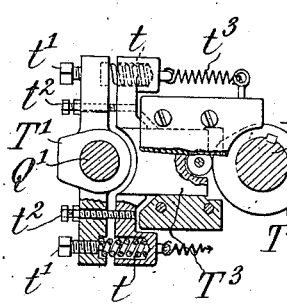
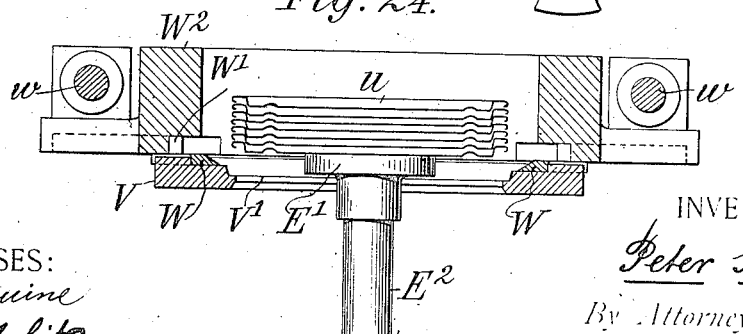
WITNESSES:
INVENTOR:
Peter Kruse,
By Attorneys.

P. KRUSE.
MACHINE FOR SEAMING CAN TOPS.
APPLICATION FILED SEPT. 25, 1912.
1,164,103.
Patented Dec. 14, 1915.
6 SHEETS—SHEET 6.
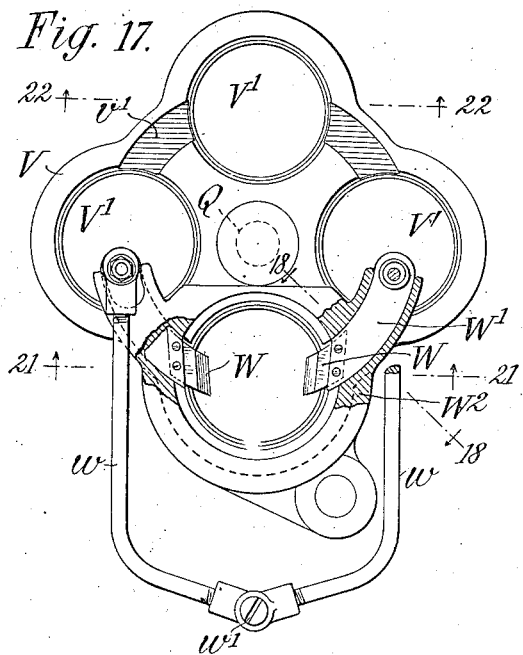
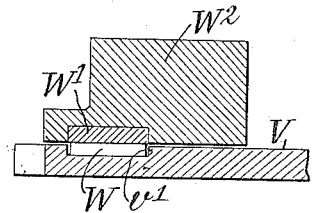
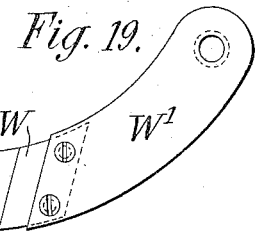
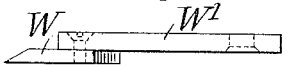
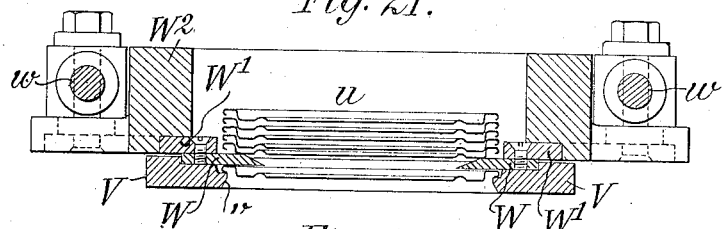
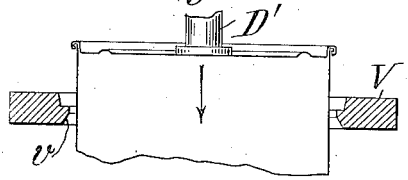
WITNESSES:
René Bruine
Fred White
INVENTOR:
Peter Kruse,
By Attorneys,
Fraser, Dunk & Myers

UNITED STATES PATENT OFFICE.

PETER KRUSE, OF BROOKLYN, NEW YORK, ASSIGNOR TO E. W. BLISS COMPANY, OF BROOKLYN, NEW YORK, A CORPORATION OF WEST VIRGINIA.

MACHINE FOR SEAMING CAN-TOPS.

1,164,103.  Specification of Letters Patent.  Patented Dec. 14, 1915.

Application filed September 25, 1912. Serial No. 722,252.

*To all whom it may concern:*

Be it known that I, PETER KRUSE, a citizen of the United States, residing in the borough of Brooklyn, county of Kings, city and State of New York, have invented certain new and useful Improvements in Machines for Seaming Can-Tops, of which the following is a specification.

The machine provided by this invention is designed for seaming the heads of round cans, and is particularly adapted for seaming the tops or covers on cans already filled. The can is held stationary, and is seamed by seamers or seaming rolls which revolve around it and which while so revolving gradually close in upon it. The cans to be seamed are in the preferred construction fed onto a conveyer which carries them to clamping disks, whereby the cans are brought successively into position beneath the seamers; the can thus placed is then lifted by a plunger to bring its top into the plane of the seaming rolls and is held there during the seaming operation, after which it is lowered, and by the next movement of the feed disk the finished can is carried out of the machine. During seaming the can is gripped by the clamping disks to hold it stationary while the seaming rolls revolve around it. The covers are fed automatically from a stack and carried to the seaming position, each can receiving its cover as it rises to the seaming level.

While the machine is directly designed for the seaming of the tops or covers on filled cans, it is nevertheless adaptable for applying the bottoms to can bodies.

The present invention is a further development of and improvement upon the machine set forth in application No. 616,717 filed March 24, 1911 (renewed Sept. 24, 1912, Serial No. 722,123).

The accompanying drawings show a machine constructed according to the preferred embodiment of the invention.

Figure 15:
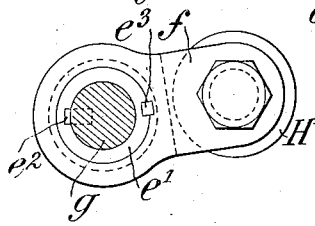
Figure 2:
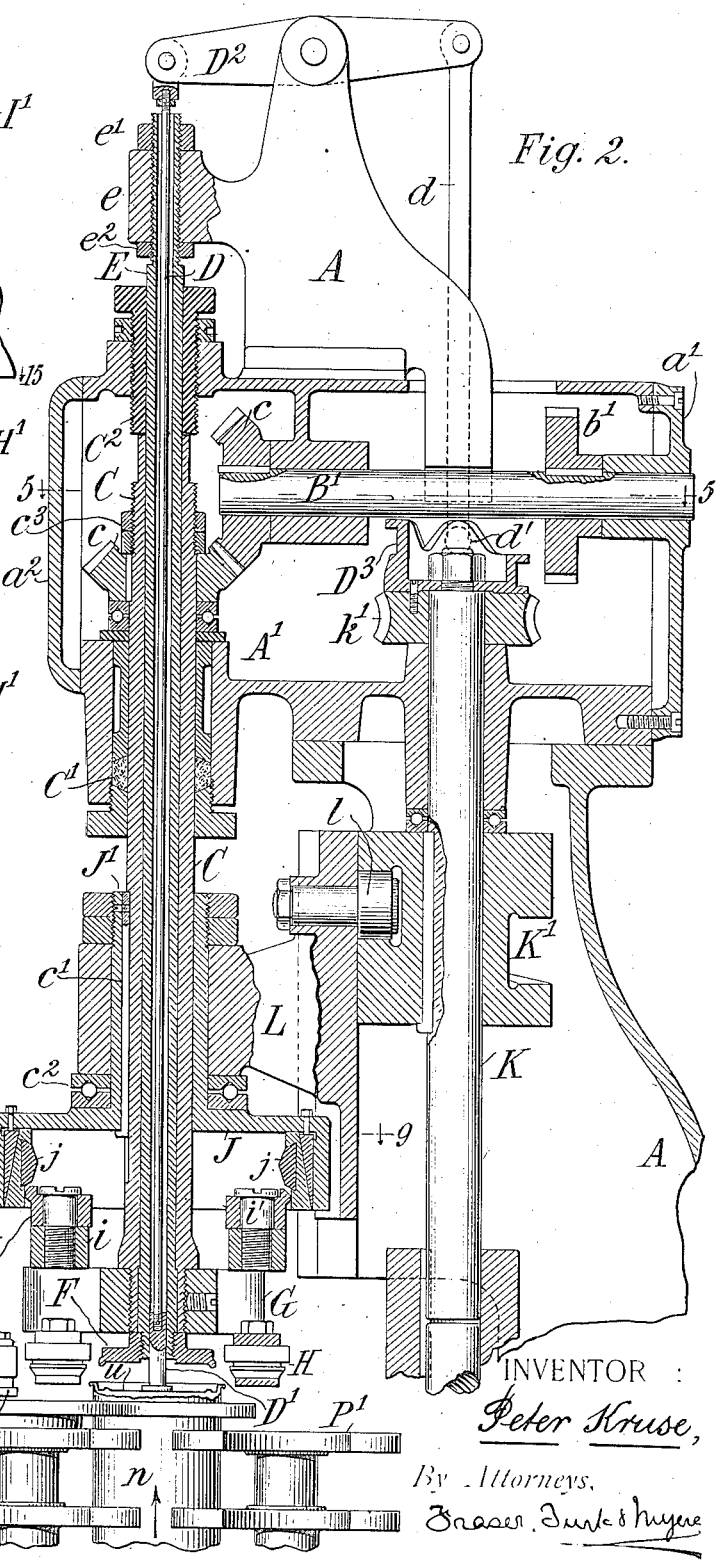
Figure 4:
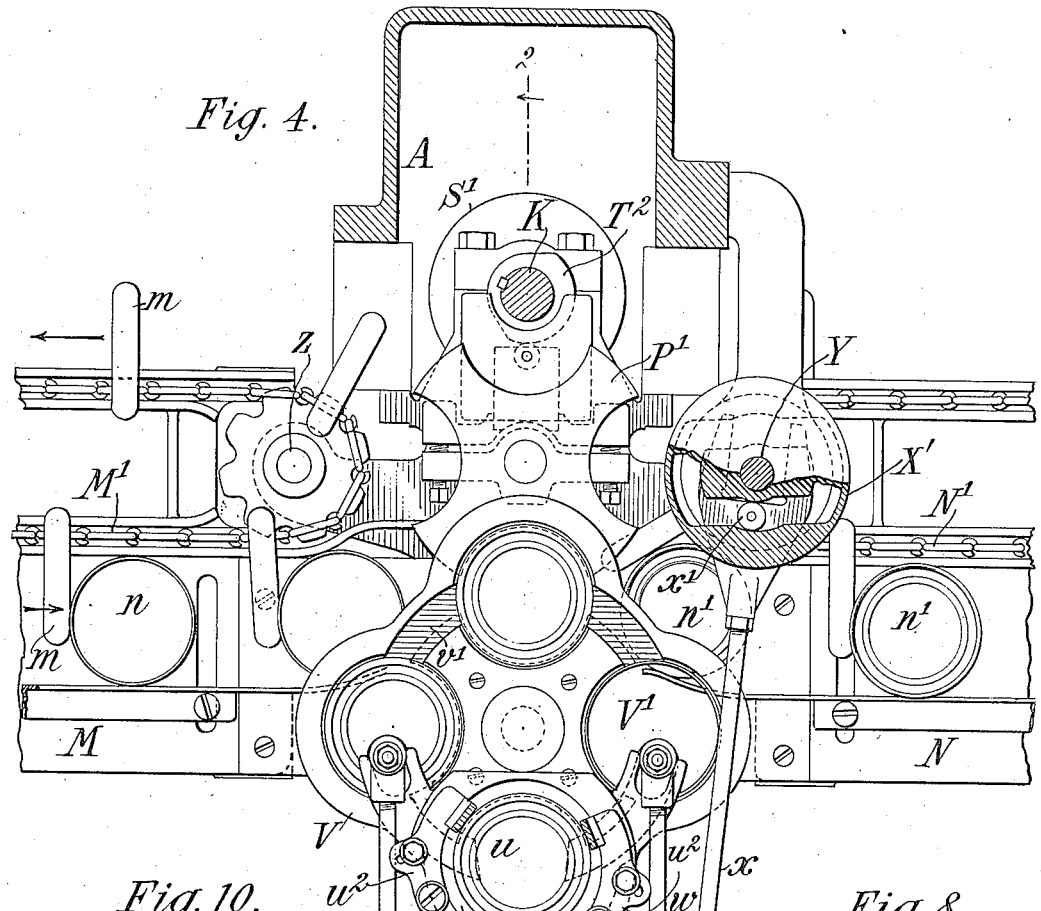
Figure 10:
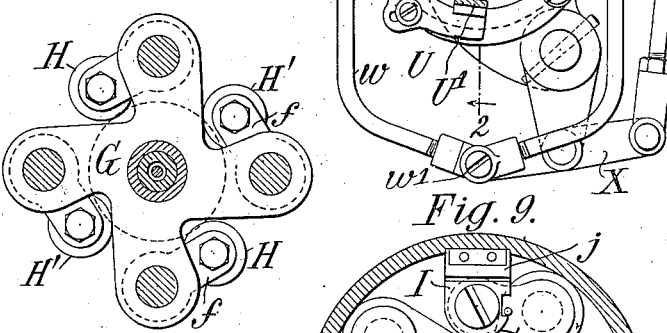
Figure 9:
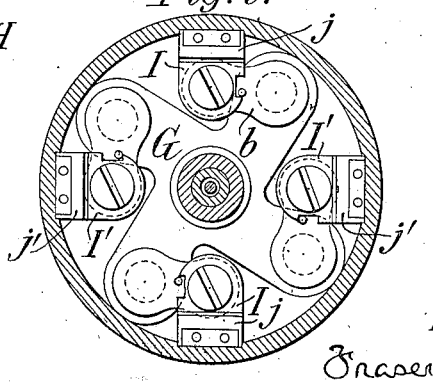
Figure 8:
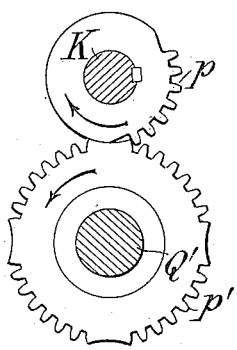

Figure 1 is a front elevation of the entire machine; Fig. 2 is a vertical section of the upper part of the machine in the plane of the line 2—2 in Fig. 4; the machine being shown with the parts in the positions occupied before the beginning of the seaming operation; Fig. 3 is a vertical section of the lower part of the machine in the same plane as Fig. 2; showing the parts in the positions occupied at the close of the seaming operation; Fig. 4 is a plan of the central part of the machine partly in horizontal section in the planes of the line 4—4 in Fig. 3; Fig. 5 is a horizontal section through the upper part of the machine in the plane of the line 5—5 in Fig. 2; Fig. 6 is a plan of the lower part of the machine being partly in horizontal section on the line 6—6 in Fig. 3; Fig. 7 is a fragmentary horizontal section showing the mechanism for gripping the can, the section being in the plane of the line 7—7 in Fig. 3; Fig. 8 is a sectional plan showing the gearing for driving the can feeding and gripping disks; Fig. 9 is a horizontal section through the upper part of the seaming mechanism in the plane of the line 9—9 in Fig. 2; Fig. 10 is a plan of the seamer head in section on the line 10—10 in Fig. 11; Fig. 11 is a vertical mid-section of the seamer head and shell showing the parts before the seaming operation; Fig. 12 is an enlarged detail of part of Fig. 11; Fig. 12ª shows one of the cam plates removed; Fig. 13 is a section in a plane at right angles to Fig. 12; Fig. 14 is a section of one of the seamer spindles on a larger scale; Fig. 15 is a horizontal section showing one of the seamer arms; Fig. 16 is a diagrammatic plan illustrating a part of the gearing; Fig. 17 is a plan corresponding to part of Fig. 4 partly in horizontal section; Fig. 18 is a vertical transverse section on a larger scale in the oblique plane of the line 18—18 in Fig. 17; Figs. 19 and 20 are a plan and front view of a cover feeding knife; Fig. 21 is a horizontal section on the line 21—21 in Fig. 17; Figs. 22 and 23 are horizontal sections on the line 22—22 in Fig. 17; Fig. 24 is a section in the same plane as Fig. 21.

Referring to the drawings, A designates any suitable frame or standard for supporting the operative parts, being shown as an upright frame providing bearings for the rotative shafts and slideways for the sliding parts, as will appear. In the preferred construction shown power is applied to a horizontal shaft B (Fig. 5) by means of a belt pulley *a* on this shaft; this shaft is geared by spur gears *b b′* to another horizontal shaft B′ which in turn drives through miter gears $c\ c$ a vertical shaft C. Thus this vertical shaft is driven either at the same speed as the driving shaft or at a different speed, as desired. The shaft C is hollow, and through it passes a stationary shaft or bar E which is fixedly clamped in a bracket $e$ on the frame A at its upper end, while its lower end carries the mandrel or chuck F against which the top of the can is to be pressed and held during the seaming. The lower end of the tubular shaft C carries the seamer head or disk G, which in turn forms a bearing for the spindles of the seamer rolls. Preferably the stationary shaft E is also made hollow or tubular, and through it passes a vertically movable rod D the lower end of which carries a knock-out pad D′ for ejecting the finished can; the rod D has vertical movements imparted to it at intervals as will be explained later.

The construction of the seamers is best shown in Figs. 3 and 9 to 15 inclusive. The seamer rolls H or H′ are carried each on a stud $h$ fixed in an arm $f$ which is mounted on the lower end of a vertical spindle $g$, the upper end of which carries a controlling arm $i$ which is actuated by a seamer actuating shell J. The arm $i$ carries a stud $i'$ on which is hung a shoe I or I′. The shoes I I′ are received within the shell J and have projecting contact faces which are acted upon by cam faces within the shell as the latter is displaced vertically, as will be described. Each arm $f$ is fastened on the lower end of its spindle $g$ through the medium of a bushing $e'$, which bushing is keyed on the spindle by a key $e^2$, and the arm is keyed on the bushing by a key $e^3$. Thus by replacing the bushing by one having a different angular relation between the respective keyways, the arm $f$ may be caused to project at a different angle relatively to the arm $i$, and consequently the seaming roll is displaced outwardly or inwardly as may be necessary in order to adjust the machine for slightly different sizes of cans.

The arms $f$ and $i$ project to the same side of the spindle $g$ so that the forcing inward of the shoe I causes a like inward movement of the seamer roll. To impart such inward movements and thereby bring the seamer rolls into action, is the function of cams $j\ j'$ carried by the shell J. These cams are mounted in pairs on diametrically opposite sides of the shell, and are preferably separate pieces or blocks held in place by being dovetailed into some part of the shell, preferably in such manner as to enable them to be adjusted toward or from the center. This adjustment is shown in Figs. 11, 12 and 13, wherein the cam block $j$ is dovetailed into an adjustable block 11 which enters a recess in the shell and is backed by a wedge 12, which latter is adjustable vertically by screws 13, 14 (Fig. 13), and after each adjustment the block 11 is set fast by tightening screws 15, 15. By this means the cam $j$ may be set toward or from the center of rotation, this adjustment being accompanied by an equal displacement of the shoe I, and a corresponding displacement of the seamer roll H, whereby the latter during its seaming operation is caused to approach closer to or farther from the axis. This adjustment is designed chiefly to enable the machine to be given its final fine adjustment to adapt it for the seaming of cans of any given diameter and given thickness of metal.

During the seaming operation the shell J executes one downward movement, followed by an upward or return movement. These movements are performed slowly as compared with the rotation of the seamer head. For imparting these movements the driving shaft B drives, through any suitable reducing gearing, preferably a worm $k$ and worm wheel $k'$, a vertical cam shaft K. This shaft carries a cam K′ the groove of which engages a roller $l$ (Fig. 2) on a vertically moving slide L which is guided in ways in the main frame A, and which slide is formed with a projection or bracket to which the shell J is so connected that it must participate in the rising and falling movements of this bracket. The shaft K turns once to each seaming operation.

To keep the cam blocks $j$ carried by the shell in engagement with the respective shoes I, the shell is connected to the shaft C by a spline or feather $c'$ introduced between the hub J′ of the shell and the shaft, and engaging a prolonged keyway in the shaft so as to admit of the vertical movements of the shell. The tubular hub J′ turns in the bracket L; to diminish friction during the downward and active movement, it is preferable to interpose a series of bearing balls $c^2$ between the bracket and shell.

For double seaming it is preferable to use two pairs of seaming rolls; the rolls H H of one pair being arranged diametrically opposite to perform the first part of the seaming operation, while the rolls H′ H′ of the other pair are arranged between those of the first pair and opposite each other to perform the final part of the seaming operation. These secondary rolls H′ have shoes I′ which are engaged by cams $j'$ in the shell J. The shoes I′ and cams $j'$ are similar to the shoes I and cams $j$ but differ in that their points of engagement are set lower, so that the rolls H H are the ones which first approach the can, the rolls H′ H′ being delayed in their approach to give time for the primary rolls to complete their operation. This timing difference might be accomplished by setting the cams $j'$ higher than the cams $j$, or by arranging the active faces of the shoes I′ lower than the active faces of the shoes I; preferably the latter arrangement is adopted.

The cams $j$ $j'$ differ but little in their active faces, as is apparent from a comparison of Figs. 12 and 12ª. The shoes I have their active faces at or near the top (Fig. 3) while the shoes I' have their active faces considerably lower (Fig. 11). It results from this that as the shell J moves downwardly its cams $j$ first engage the active faces of the shoes I and thereby force inwardly the seaming rolls H so that these rolls perform the first part of the seaming operation; the continued downward movement of the shell J brings the cams $j'$ into engagement with the active faces of the shoes I', so that immediately after the primary rolls have completed their work the secondary or finishing rolls H' are moved in far enough to come into action; preferably the primary rolls are caused to recede at this time by causing the upper portions of the cams $j$ to travel away from the center; when the secondary seamers have completed their operation the shell J moves upward, whereby the cams have an inverse action upon the shoes, resulting in the seaming rolls H' H moving successively outward, being so moved by the centrifugal force due to the rapid rotation whereby the finished can is freed.

For feeding the cans to the seaming mechanism it is preferable to provide a feed table on which the cans are placed by the operator, and along which they are moved automatically by an endless carrier. Similar means may be provided for carrying away the closed and seamed cans. A feed table is shown at M in Figs. 1 and 4, the cans being pushed along this table by pushing arms $m$ carried by an endless chain M'. The cans to be headed are lettered $n$ $n$, and those which have been closed are lettered $n'$ $n'$. For discharging the finished cans a similar table N is provided along which the cans are moved by pushers carried on an endless chain N'. As the cans approach the seaming position they are engaged by a positive feed mechanism which brings them successively to a point coincident with the axis of the seaming mechanism; each can is then lifted to the proper level, and is then gripped to hold it fixedly in place during the action of the seamers. If the cover has not already been applied, it is applied automatically during the lifting movement of the can. The seaming is then performed and the finished can is then lowered to its original level and is then fed out of the machine.

For feeding the cans from the feeding conveyer to the seaming point, rotary feeders P P' are provided which serve also as the gripping means. These are best constructed as disks, being preferably double for high cans, so as to engage the can in two different planes. They are mounted on upright shafts Q Q' which are geared together so as to turn in unison by means of gears $q$ $q'$ (Fig. 3). The notches in these disks are preferably circular arcs conforming closely to the circumference of the can and having their centers coincident in the position in which they reciprocally grasp the can, so that in this position they bring the can to its true circular contour and hold it so during the subsequent lifting movement. Preferably the line of travel of the approaching cans is somewhat out of coincidence with this common center, as is shown in Figs. 4 and 6, so that the feeding disk P in engaging the can carries it somewhat rearwardly to bring it to the seaming point. For imparting the requisite intermittent rotations to the feeding disks, the shaft of one of these disks is engaged by any suitable mechanism, preferably a Geneva stop movement such as that shown in Fig. 8. For this purpose the upright cam shaft K is prolonged downwardly (being conveniently made in two sections coupled together), and on its lower end it carries the Geneva pinion $p$ which meshes with the Geneva gear $p'$ which in this instance is fixed on the shaft Q'.

The can is slid from the table M onto the top of a platen or plunger R, which plunger is then lifted by a slide S which derives motion from a cam S' carried on the shaft K and engaging in its groove a roller $s$ carried by this slide. Between the plunger R and slide S is a spring or yielding buffer $r$, the purpose of which is to enable the plunger R to adapt itself to slight variations in the heights of the cans. The height of the plunger may be varied by adjusting nuts $r'$.

When the can has been lifted by the plunger R it is gripped between the carrier disks P P' by causing these disks to approach one another. For this purpose it is ordinarily only necessary to move one of the disks, and as the movement is very slight, it is most simply accomplished by springing the upper end of one of the shafts Q or Q' toward the other shaft. For this purpose the shaft Q' is shown as extended through a sleeve T which is internally slightly tapered at the upper part so as to give a slight freedom of movement to the upper end of the shaft Q, and this shaft is engaged by a cross-head T' which is indirectly acted upon by a cam T² on the shaft K, whereby to impart the requisite approaching and receding movements to the carrier disk P' for gripping and releasing the can. The cam T² acts against a roller carried by a slide T³ having a cross-head which connects with the cross-head T' through the medium of interposed compression springs $t$ $t$ (Fig. 7) adjustable by screws $t'$ $t'$, the cross heads being positively connected by screw rods or bolts $t^2$ to limit their separation. The combined stress of the springs $t$ is sufficient to move the shaft Q′ and cause the carrier P′ to grip the can against the opposite carrier, but is not sufficient to crush or distort the can, such distortion being prevented by the yielding of the springs $t$. When the cam T² releases the slide T³ the carrier P′ may be caused to move away from the can to release it by reason of the resiliency of the shaft Q′; or any other retracting means may be provided, such as springs $t^3$ Fig. 7.

The pad D′ already referred to is moved vertically in the following manner: Its rod D passes out through the top of the tubular shaft E and is there connected to a lever D² fulcrumed on the frame A, and having connected to its opposite arm a rod $d$ which extends downwardly and carries at its lower end a roller $d'$ which is engaged in the groove of a cam D³ carried by the upper end of the cam shaft K. The functions of the pad D are two-fold:—(1) When the plunger R lifts the can with its cover (applied thereon in any known manner), the pad being then lowered to approximately the position shown in Fig. 2, is encountered by the can cover and thereupon moves upward with the can, ascending at a speed no greater than that of the plunger R, or even less, so that the spring $r$ is compressed, and the pad serves the purpose of holding the cover down firmly upon the can, so that in the case of a filled can any displacement of the contents is avoided; (2) after the seaming operation the pad D′ serves as a knockout, moving downwardly to force the seamed can down with the descent of the plunger R and to separate it from the chuck or mandrel F in case the seaming operation has caused it to cling thereto. To perform these functions the pad has vertical movements imparted to it by the cam D³, moving first upwardly with the ascent of the can, then remaining stationary during the seaming, then moving downwardly to push out the seamed can, and then preferably moving upwardly to clear the seamed can before the latter is carried away by the next turning movement of the feed disks P P′, (and to rise clear of the disk V to be described) and after the next succeeding can has been fed beneath it, moving down to meet it preparatory to a repetition of the movements described.

In the described operations it will be seen that the spring $r$ serves according to its adjustment to regulate the pressure with which the can and its cover are squeezed between the plunger R and pad D′. Its stress is sufficient to lift the can against any frictional or other obstacle encountered and hold it up firmly against the seaming chuck. The pad D′ has a positive movement in order that it may be able to eject the seamed can irrespective of any obstruction thereto.

Although the can heads might be placed on the cans by hand, yet it is preferable to feed and place them automatically. For this purpose the can heads or covers $u\ u$ are placed in a stack in a skeleton guide or reservoir U, and means are provided for cutting out the lowermost cover from the stack, dropping it into a recess in a carrier, and then by the movement of this carrier conveying it to a position concentric with and below the seaming mechanism, where it stands just above the top of the can to be covered, so that as the can is pushed up the cover is lifted out of the recess and carried up with the can to the seaming plane, and after the seaming the seamed can is pushed down through the recess and fed out. Preferably the carrier is a disk rotating intermittently in unison with the feed disks P P′.

In the construction shown the carrier disk V is mounted on the same shaft Q as the feed disk P. It has four openings V′ each of which has a flared or conical portion $v$ in its under part, while its upper part is counterbored to form a recess $u'$ of such size as to receive within it the cover $u$, as shown in Fig. 22. At the bottom of the stack of covers are arranged opposite separating knives W W which reciprocate toward and from the center of the stack. These are best shown in Figs. 17 and 21, where they are advanced. In their advancing movement they enter between the lowermost cover and the one next above, and lift the latter with the superincumbent stack of covers, leaving the bottom cover resting in the recess $u'$, as shown in Fig. 21. The separating knives thus forcibly separate the covers and prevent the possible feeding of two covers together, or their jamming, as might result from the sticking together of two adjoining covers. While the knives thus uphold the stack of covers, the disk V turns and carries the lowermost cover away in its recess. This movement brings an empty recess under the stack, and as the knives W W then move apart, the entire stack is permitted to fall, and the lowermost cover thereby enters the next recess, being then in turn separated from the covers above by the re-approach of the knives, and so on. Thus at each forward movement of the disk it carries a cover away from the stack. On reaching the seaming axis this cover is presented directly above a can. In the lifting movement of the can the top thereof enters the opening, as shown in Fig. 22. If the can is not exactly centered, it is brought to center by the guiding cone surface $v$. If the can is distorted so that it is not in a true circle, the final movement through the opening springs it to a true circle, so that as it rises beneath the cover its flange enters the flange thereof. As the can usually makes a snug fit with the cover, so that some pressure is required to bring the can top and cover fully together, provision is made that the pad D' shall come down upon the cover, as shown in Fig. 22, before the top of the can moves up into the cover, and shall remain there and hold the cover down in the recess $u'$ while the top of the can body is being pushed up into it. Thereupon the continued rising of the can carries the cover up with it to the seaming plane where the seaming operation is performed. The pad D' moves up at the same speed, as described, so that it holds the cover firmly in place during the ascent of the can. After the seaming the can is lowered as already described. The opening V' is of such size that its smallest portion forms a free working fit with the outturned flange before seaming, and an equally free or more free working fit with the seam upon the seamed can. This permits the seam to freely pass down through the opening which previously supported the cover by reason of the larger diameter of the latter. The can is shown in Fig. 23 in its downward movement.

The knives W W are preferably formed as arcs of circles, and are best mounted in arc-shaped slides W' which slide in ways formed in a stationary guide $W^2$ which may form also the base of the reservoir U. To enable them to work as close as possible to the feed disk V, the latter is formed with a concentric groove $v'$ in its top into which the arc-shaped knives W W project, in order that their working edges may be brought down to a level just above the top of the cover which is in the recess in the carrier disk V. For imparting the simultaneous approaching and receding movements various mechanisms may be provided, that shown comprising links $w$ $w$ connecting at $w'$ to one arm of a lever X (Fig. 4) the opposite arm of which is connected by a rod $x$ to a cam X' (Fig. 4) carried on an upright shaft Y which is driven from the shaft K. This cam is shown as having a groove which engages a roller $x'$ carried by the rod $x$. Thus equal and opposite reciprocatory movements are imparted to the arc-shaped slides or separating knives W W. The rod $x$ is adjustable in length to adjust the approach of the knives W W.

All the feed mechanism is driven from the shaft K. The can feeding-in and feeding-out conveyer chains M' and N' are driven by sprockets on shafts Z and Y respectively (Figs. 1 and 16) which turn continuously, geared to the shaft by sprocket wheels and chain, as shown in Fig. 16, where $y$ is a chain driven from a sprocket pinion $y'$ on the shaft K, and driving sprocket wheels $z$ $z'$ on the shafts Z and Y respectively. For taking up the slack and for giving the chain a suitable wrap around the pinion $y'$, idler pinions $y^2$ are provided mounted upon arms $y^3$ whereby their positions may be adjusted.

Sufficient space is left between the arms $m$ $m$ so that the cans in feeding in, follow at sufficient intervals to give time for the seaming of one can before the next following can reaches the position where it is grasped between the feeding disks P P'.

For adjusting the seamer head vertically the shaft C is made adjustable. For this purpose its upper end is seated against a screw sleeve $C^2$ having threads engaging the stationary frame, this screw sleeve thus forming an adjustable end bearing for the shaft C. The miter gear $c$ on this shaft is adjustable by means of nuts $c^3$, by setting which the shaft may be set higher or lower than the miter gear. By means of these two adjustments the shaft and seamer head may be raised or lowered as required. The mandrel F requires to be correspondingly adjusted, and for this purpose its stationary shaft E is fastened to the bracket $e$ by adjustable nuts $e'$ $e^2$.

For adjusting the machine to cans of different heights, the feed tables M and N are made vertically adjustable, together with the feed chains, the feed disks P P', plunger R, and their accessories, in order to be able, without adjustment of the height of the seaming head, to vary the planes occupied by the bottoms of the cans in accordance with their height. For this purpose the shafts Q Q', cam S', cam $T^2$, and the sprocket wheels and chains, are all carried on a vertically adjustable frame Z' which is movable up or down by means of a screw $Z^2$ engaged by the threaded hub of a hand wheel $z^3$ connected to any fixed part of the frame. This frame Z' supports the approaching ends of the tables M, N, which are hinged to it at $x^2$ $x^2$, the opposite ends of these tables being supported by posts $M^2$ $N^2$ respectively, which are adjustable to different heights in order that the tables M and N after any given adjustment of the intervening frame Z', may be leveled by the adjustment of their outer ends to equal heights.

This machine is designed to be used principally for applying covers to cans already filled with their intended contents. Frequently these contents are of wet material, as for example in the case of canned fruits, and with such materials there is danger of spilling or slopping the contents by reason of the motion of feeding-in chain M' and of the intermittent feeding-in movements imparted by the feed disks P P', which as shown in Fig. 6 receive the cans from the chain pushers $m$ and by a more rapid movement carry them onto the plunger R. For preventing the spilling or slopping of the contents during these feeding movements, I provide a top plate B', shown in Figs. 1 and 6, which extends for some distance over the feed table M and terminates (as shown in dotted lines in Fig. 6) as close as practicable to the seaming mechanism, so that it serves for covering over the open tops of the cans until just before they receive their covers. The plate B' is pressed closely down upon the can tops.

The cover reservoir U is shown as constructed with three upright bars or frames U' for holding the stack of covers, which are adjustable for covers of different diameters by means of supporting arms $u^2$ (Fig. 4) which are pivotally mounted upon a base frame and capable of swinging outwardly or inwardly and being then set by set-screws, this being a known construction.

In the operation of the cover feeding mechanism described, it is occasionally found that the covers do not feed down readily from the stack into the recess $u'$. In such cases it is desirable to impart a forcible lift to the covers of the stack, which should be in excess of that which can be imparted by the wedging inclines of the knives W W. When this effect is needed, I provide a lifting pad E', best shown in Fig. 24, which may conveniently be carried on an upright rod $E^2$, which as shown in dotted lines in Fig. 3, may be mounted on a forward extension $S^2$ of the slide S. Thus the pad E' is elevated coincidently with the lifting of the can by the plunger R. The pad E' being adjusted to the precisely correct height, the action is as follows:—At each turning movement of the feed disks P, V, the pad E' moves up through an empty opening V', encounters the stack of covers which at this time are supported on the knives W W and lifts the stack of covers off these knives. The pad remains stationary, holding the covers elevated during the time occupied by the seaming operation. Then as the seamed can is being lowered by the descent of the plunger R, the corresponding descent of the pad E' lowers the stack of covers so that the lowermost cover drops into the recess $u'$. Meanwhile however the knives W have been retracted. Thereupon the knives advance and lift the stack of covers so as to leave only the lowermost one in the recess, whereupon the disk V is free to make its next turning movement. It is desirable to make the pad E' and its accessories detachable, so that they may be removed from the machine when this pad is not needed.

For the better lubrication of the driving gearing, including the gears $b\ b'$, $c\ c$, $k\ k'$ and cam $D^3$, these parts are inclosed in an oil chamber A' (Figs. 2 and 5) formed by closing in a hollow section of the frame A by means of the separable front and back plates $a^2\ a'$. Thus these gears are caused to run in oil. For preventing loss of oil from this chamber around the rapidly revolving shaft C, a stuffing box C' is provided, as shown in Fig. 2.

Although the described machine is designed particularly for seaming the tops of filled cans, it is readily adaptable to seaming tops of empty cans to be afterward filled through an opening in the top; or for seaming the bottoms of can bodies. Although described as for double seaming, yet it is readily applicable for any simpler seaming operation by employing the requisite type of seaming rolls. If a double seam is not required, the rolls H' H' and their appurtenances may be omitted.

It must not be inferred from the particularity with which in this specification I have described the various details of the machine, that my invention is necessarily limited to such details, since my invention is susceptible of considerable modification, its practical embodiments being varied according to the requirements of particular cases. The machine described is susceptible of a wide range in the substitution of equivalents, and in structural modifications, without departing from its essential features.

I claim as my invention:—

1. A can-top seaming machine comprising a revolving seamer head, upright oscillatory spindles carried thereby, having lower arms carrying seamers and upper controlling arms, a controlling shell revolving with said head having internal cams with active faces engaging said upper arms, and means for displacing and returning said shell during the seaming operation.

2. A can-top seaming machine comprising a revolving seamer head, upright oscillatory spindles carried thereby, having lower arms carrying seamers and upper controlling arms, a controlling shell revolving with said head having upon its inner side adjustable cam pieces with their active faces engaging said upper arms, and means for displacing and returning said shell during the seaming operation.

3. A can-top seaming machine comprising a revolving seamer head, upright oscillatory spindles carried thereby, having lower arms carrying seamers and upper controlling arms, a controlling shell revolving with said head, adjustable cam pieces carried by said shell, having their active faces engaging said upper arms, adjusting means for varying the positions of said cam-pieces to thereby vary the operative positions of the seamers, and means for displacing and returning said shell during the seaming operation.

4. A can-top seaming machine comprising a revolving seamer head, upright oscillatory spindles carried thereby, having lower arms carrying seamers and upper controlling arms, a controlling shell revolving with said head, adjustable cam pieces carried by said shell, having their active faces engaging said upper arms, adjusting means for varying the positions of said cam-pieces to thereby vary the operative positions of the seamers, said means comprising wedges behind said cam-pieces, and screws for locating said wedges, and means for displacing and returning said shell during the seaming operation.

5. In a can-top seaming machine, the combination with seaming mechanism of a plunger for lifting the can thereto, a can-feeding device adapted to feed successive cans onto said plunger, comprising an intermittently rotating feed disk and means acting after the lifting movement of said plunger for displacing said feed disk to grip the can and to hold it immovable during the seaming operation.

6. In a can-top seaming machine, the combination with seaming mechanism of a plunger for lifting the can thereto, a can-feeding device adapted to feed successive cans onto said plunger, comprising two intermittently rotating feed disks having coinciding notches engaging the can body, and means acting after the lifting movement of said plunger for causing said feed disks to grip the can between them and to hold it immovable during the seaming operation.

7. In a can-top seaming machine, the combination with seaming mechanism of a can feeding device comprising two intermittently rotating feed disks connected to turn in unison and adapted to engage the can between them, and means for displacing one of said disks toward the other to grip the can.

8. In a can-top seaming machine, the combination with seaming mechanism of a can feeding device comprising two intermittently rotating feed disks connected to turn in unison and adapted to engage the can between them, shafts carrying said feed disks, one of which shafts is movable at its end carrying the feed disk, and means for moving such end of said shaft to displace its disk toward the other to grip the can.

9. In a can-top seaming machine, the combination with seaming mechanism of a can feeding device comprising two intermittently rotating feed disks connected to turn in unison and adapted to engage the can between them, shafts carrying said feed disks one of which is flexible, and means for flexing such shaft to displace its disk toward the other to grip the can.

10. In a can-top seaming machine, the combination with seaming mechanism, a plunger for lifting the can thereto, a can-feeding device for feeding successive cans to said plunger, and means operative after the lifting movement of the plunger for gripping the can to hold it during the seaming operation, and a spring in said gripping mechanism whereby the can is gripped yieldingly.

11. In a can-top seaming machine, the combination with seaming mechanism of a can feeding device comprising two intermittently rotating feed disks connected to turn in unison and adapted to engage the can between them, and relatively movable to grip the can, means for imparting such gripping movement, and a spring operatively related to one of the feed disks whereby the can is gripped yieldingly.

12. In a can-top seaming machine, the combination with seaming mechanism of a can feeding device comprising two intermittently rotating feed disks connected to turn in unison and adapted to engage the can between them, and relatively movable to grip the can, a cam-operated slide for imparting such gripping movement, and a spring between the cam and one of the feed disks whereby the can is gripped yieldingly.

13. In a can-top seaming machine, the combination with seaming mechanism and a plunger for lifting the can thereto, of a cover feeder of rigid material having a recess in its upper side for receiving the cover, and a concentric opening through it for admitting the can, said opening being coned to guide the can top concentrically into the cover, and movable from a cover-receiving position to a position beneath said seaming mechanism, and the plunger movable in the latter position to lift the can through said opening and thereby apply the cover thereon and to further lift the can and cover into operative engagement with said seaming mechanism.

14. In a can-top seaming machine, the combination with seaming mechanism and a plunger for lifting the can thereto, of a cover feeder comprising an integral plate of rigid material having a recess in its upper side for receiving the cover, and a concentric opening of invariable size through it for admitting the can, said opening of such size as to make a close working fit with the flanged top of the can, and to admit the passage through it of the top seam after seaming, said feeder movable from a cover-receiving position to a position beneath said seaming mechanism, and said plunger movable to lift the can through said opening to apply the cover, and to further lift the can and cover to said seaming mechanism, and descending after the seaming to lower the seamed can through said opening.

15. In a can-top seaming machine, the combination with seaming mechanism of cover feeding means comprising a reservoir for holding a stack of covers, a movable feeder having a recess in its upper side adapted in one position to come under said stack, means for dropping said stack whereby the lowermost cover is received in said recess, and for subsequently separating and lifting the superimposed stack of covers from said lowermost cover, to permit the latter to be fed away by the succeeding movement of the feeder.

16. In a can-top seaming machine, the combination with seaming mechanism of cover feeding means comprising a reservoir for holding a stack of covers, a movable feeder having a recess in its upper side adapted in one position to come under said stack and receive the lowermost cover in said recess, and means for dropping the stack of covers when the feeder is in such position, and for separating the superincumbent stack from said lowermost cover, comprising opposite reciprocating separator knives movable independently of the feeder to cut out such lower cover from said stack and adapted to lift the stack therefrom and to hold the stack during the feeding away movement of said feeder.

17. In a can-top seaming machine, the combination with seaming mechanism of cover feeding means comprising a reservoir for holding a stack of covers, a cover feeding disk having recesses for receiving the covers, presented successively beneath said stack, and means for dropping the stack whereby the lowermost cover is received in a recess of the disk, and for separating and lifting the superincumbent stack of covers from said lowermost cover, whereby the latter is left in said recess to be fed at the next movement of the disk.

18. In a can-top seaming machine, the combination with seaming mechanism of cover feeding means comprising a reservoir for holding a stack of covers, a cover feeding disk having recesses for receiving the covers, presented successively beneath said stack, said disk having a concentric groove and a reciprocating separator knife projecting into said groove and movable to separate the lowermost cover in said recess from the superincumbent covers of said stack.

19. In a can-top seaming machine, the combination with seaming mechanism of cover feeding means comprising a reservoir for holding a stack of covers, a cover feeding disk having recesses for receiving the covers, presented successively beneath said stack, said disk having a concentric groove and arc-shaped separator knives projecting into said groove and movable to separate the lowermost cover in said recess from the superincumbent covers of said stack.

20. In a can-top seaming machine, the combination with seaming mechanism of cover feeding means comprising a reservoir for holding a stack of covers, two opposed reciprocating separator knives movable concurrently to cut out the lowermost cover from said stack, links connecting said knives to a cam-operated part whereby to impart to said knives simultaneous movements toward and from the covers, and means for carrying said lowermost cover thence to the seaming mechanism.

21. In a can-top seaming machine, the combination with seaming mechanism of cover feeding means comprising a reservoir for holding a stack of covers, two opposed reciprocating separator knives movable to cut out the lowermost cover from said stack, links connecting said knives to an operating lever, said lever, a cam for operating it, and adjusting means whereby to simultaneously adjust said knives.

22. In a can-top seaming machine, the combination with seaming mechanism of cover feeding means comprising a reservoir for holding a stack of covers, a movable feeder having a recess in its upper side adapted in one position to come under said stack, a vertically moving pad adapted to ascend through said recess and lift the stack of covers, whereby on its descent it drops the stack with its lowermost cover in said recess, and means for thereupon separating the superincumbent covers from said lowermost cover.

23. In a can-top seaming machine, the combination with seaming mechanism of cover feeding means comprising a reservoir for holding a stack of covers, means for separating the lowermost cover therefrom, means for alternately lifting the stack of covers in said reservoir off from said separating means and for dropping them, and means for carrying the separated cover therefrom to the seaming mechanism.

24. In a can-top seaming machine the combination of seaming mechanism and a plunger for lifting the can thereto, of cover feeding means comprising a reservoir for holding a stack of covers, a rising and falling pad adapted to alternately lift and drop said stack of covers, means for separating the lowermost cover and for carrying it therefrom to the seaming mechanism, and a vertically reciprocating slide carrying said plunger and pad and imparting substantially simultaneous movements thereto.

25. In a can-top seaming machine the combination with seaming mechanism comprising seaming-rolls revolving around the circumference of the can-top, of cover feeding means comprising an intermittently revolving feed disk below said seaming mechanism having successive openings, each opening affording a recess for the cover in its upper part and a tapering guide for the can body in its under part, and a plunger coöperating therewith for lifting the cans successively through said openings to apply the covers thereon and to carry them to the seaming mechanism.

26. In a can-top seaming machine, the combination with seaming mechanism comprising seaming rolls revolving around the circumference of the can-top, of cover feeding means beneath such seaming mechanism comprising a cover carrier having a cover receiving recess in its upper side with a can guiding opening concentric therewith adapted to admit the flanged end of a can body to pass through it, means for elevating such can body through and above such opening, whereby it enters beneath the cover and lifts the latter to the seaming position, said seaming mechanism adapted in seaming on the cover to reduce the seam to a diameter less than that of said opening, whereby on the descent of such elevating means the seamed can top passes freely down through said opening.

27. In a can-top seaming machine, the combination with seaming mechanism of cover feeding means comprising a cover feeder, a recess in its upper side for receiving the cover, and a concentric opening through it for admitting the can body, means for elevating such can body through and above such opening, a cover holding pad movable down onto said cover and remaining stationary thereon during the upward movement of the can body and until the latter has been lifted into firm contact with said cover, and thereupon rising to permit the further ascent of the can body and cover to the seaming position.

28. In a can-top seaming machine, the combination with seaming mechanism of cover-feeding means comprising a reservoir for holding a stack of covers, a cover-feeding disk having recesses for receiving the covers, presented successively beneath said stack, means for dropping the stack whereby the lowermost cover is received in a recess of the disk, and a reciprocating separator knife movable to separate and lift the superincumbent stack of covers from said lowermost cover and leave the latter in said recess to be fed at the next movement of the disk.

29. In a can-top seaming machine, the combination with seaming mechanism and a plunger for lifting the cans thereto, of can feeding means for conveying the cans to said plunger comprising a feed table and feed chain, a movable frame for carrying said plunger and feeding means, said feed table hinged at one end thereto and having an adjustable support for its opposite end, and means for vertically adjusting said frame.

30. In a can-top seaming machine, the combination with seaming mechanism and a plunger for lifting the cans thereto, of can feeding means for conveying the cans to said plunger comprising a feed table and feed chain, and having means for conveying the seamed cans from the seaming mechanism comprising a feed table and feed chain, a movable frame for carrying said plunger and feeding means, said feed tables hinged thereto at their adjoining ends, vertically adjustable supports for their remote ends, and means for vertically adjusting said frame.

In witness whereof, I have hereunto signed my name in the presence of two subscribing witnesses.

PETER KRUSE.

Witnesses:
  FREDK. C. FLADD,
  F. L. COLWELL, Jr.